(12) United States Patent
Chen et al.

(10) Patent No.: US 12,329,713 B1
(45) Date of Patent: Jun. 17, 2025

(54) EASILY ADJUSTABLE WALKING AID

(71) Applicant: YONGKANG BEIQIN INDUSTRY & TRADE CO., LTD, Jinhua (CN)

(72) Inventors: Jinfei Chen, Jinhua (CN); Zhanxiang Wang, Jinhua (CN)

(73) Assignee: YONGKANG BEIQIN INDUSTRY & TRADE CO., LTD, Jinhua (CN)

( * ) Notice: Subject to any disclaimer, the term of this patent is extended or adjusted under 35 U.S.C. 154(b) by 0 days.

(21) Appl. No.: 18/947,549

(22) Filed: Nov. 14, 2024

(30) Foreign Application Priority Data

Oct. 23, 2024 (CN) .......................... 202422566223.6

(51) Int. Cl.
*A61H 3/04* (2006.01)
*B62B 5/04* (2006.01)

(52) U.S. Cl.
CPC .............. *A61H 3/04* (2013.01); *B62B 5/0447* (2013.01); *B62B 5/0485* (2013.01); *A61H 2003/046* (2013.01); *A61H 2201/1633* (2013.01)

(58) Field of Classification Search
CPC ................ A61H 3/04; A61H 2003/046; A61H 2201/1633; B62B 5/0447; B62B 5/0485; B62B 5/04; B62B 5/0438
See application file for complete search history.

(56) References Cited

U.S. PATENT DOCUMENTS

| | | | | |
|---|---|---|---|---|
| 2,915,776 A | * | 12/1959 | Hanson | B60B 33/045 16/21 |
| 3,279,567 A | * | 10/1966 | Kempel | A61H 3/04 188/29 |
| 4,029,311 A | * | 6/1977 | Chanslor | A61H 3/04 188/29 |
| 4,907,794 A | * | 3/1990 | Rose | A61H 3/04 280/43.24 |
| 5,046,748 A | * | 9/1991 | Oat-Judge | B62B 5/0438 482/68 |
| 5,224,717 A | * | 7/1993 | Lowen | A61H 3/04 135/73 |
| 5,538,268 A | * | 7/1996 | Miller | A61H 3/04 482/68 |

(Continued)

FOREIGN PATENT DOCUMENTS

| | | |
|---|---|---|
| CN | 210991590 U | 7/2020 |
| CN | 113545929 A | 10/2021 |
| CN | 113712788 A | 11/2021 |

*Primary Examiner* — James M Dolak
(74) *Attorney, Agent, or Firm* — George D. Morgan

(57) ABSTRACT

The present invention discloses an easily adjustable walking aid, including two support frames, where the support frame is provided with a first adjusting assembly, a telescopic adjusting seat is disposed between the two support frames, a second adjusting assembly is disposed on the support frame, and a part of the second adjusting assembly is connected to the first adjusting assembly. The first adjusting assembly cooperates with the second adjusting assembly, so that when the walking aid is braked, a brake handle can be prevented from being pressed for a long time, and four wheels of the walking aid can also be braked synchronously. In addition, the height of the walking aid can be adjusted based on the height of a user. What's more, the telescopic adjusting seat is disposed for better storing the walking aid, so that the walking aid can be better used and carried.

6 Claims, 9 Drawing Sheets

(56) References Cited

U.S. PATENT DOCUMENTS

| | | | | |
|---|---|---|---|---|
| 5,716,063 A * | 2/1998 | Doyle | A61H 3/04 | 280/87.041 |
| 5,927,441 A * | 7/1999 | Luo | B62L 3/02 | 74/489 |
| 6,099,002 A * | 8/2000 | Uchiyama | A61H 3/04 | 280/87.021 |
| 6,212,969 B1 * | 4/2001 | Kuo | B62L 3/02 | 188/19 |
| 6,357,077 B1 * | 3/2002 | Jones, Jr. | B60B 33/045 | 16/35 D |
| 6,378,663 B1 * | 4/2002 | Lee | A61H 3/04 | 188/19 |
| 6,817,451 B1 * | 11/2004 | Chen | B62B 9/085 | 188/29 |
| 7,219,906 B2 * | 5/2007 | Hallgrimsson | A61H 3/04 | 280/87.041 |
| 7,410,179 B2 * | 8/2008 | Lonkvist | A61H 3/04 | 280/655.1 |
| 7,780,180 B2 * | 8/2010 | Hoepner | A61H 3/04 | 280/263 |
| 8,596,658 B1 * | 12/2013 | Dashew | A61H 3/04 | 5/81.1 R |
| 8,931,366 B2 * | 1/2015 | Wu | B60T 7/102 | 74/489 |
| 8,998,223 B2 * | 4/2015 | Chang | B60T 7/102 | 280/87.021 |
| 9,022,397 B1 * | 5/2015 | Prettyman | B62B 5/0447 | 280/47.34 |
| 9,022,413 B2 * | 5/2015 | Liu | B62B 5/04 | 280/651 |
| 9,062,749 B2 * | 6/2015 | Tsay | B60T 11/046 | |
| 9,221,433 B2 * | 12/2015 | Dunlap | B60T 1/005 | |
| 9,642,767 B1 * | 5/2017 | Kavanagh | A61H 3/00 | |
| 9,662,264 B2 * | 5/2017 | Jacobs | A61H 3/04 | |
| 9,775,766 B2 * | 10/2017 | Andersen | A61H 3/04 | |
| 11,071,676 B2 * | 7/2021 | Fellingham | A61H 3/04 | |
| 11,305,835 B2 * | 4/2022 | Liang | B62L 3/08 | |
| 11,318,919 B2 * | 5/2022 | Zhong | F16D 55/40 | |
| 11,559,459 B2 * | 1/2023 | Whitmore | A61H 3/04 | |
| 11,648,170 B1 * | 5/2023 | Abrahamson | F16C 1/18 | 280/47.34 |
| 12,226,362 B2 * | 2/2025 | Van Varick | A61H 3/04 | |
| 12,274,663 B2 * | 4/2025 | Li | A61H 3/04 | |

* cited by examiner

EASILY ADJUSTABLE WALKING AID

CROSS-REFERENCE TO RELATED APPLICATIONS

The application claims priority to Chinese patent application No. 202422566223.6, filed on Oct. 23, 2024, the entire contents of which are incorporated herein by reference.

TECHNICAL FIELD

The present invention relates to a technical field, and in particular to an easily adjustable walking aid.

BACKGROUND

In modern life, to meet the travel needs of the elderly and people with reduced mobility, in response to the trend of green environmental protection, and because of people's inherent impression of wheelchairs and a lot of restrictions on electric scooters, walking aids, as devices to assist walking, feature lightweight, can support weight, maintain standing balance, and improve the user's walking ability, which are important tools for walking and rehabilitation training. The walking aids are easy to use and affordable, and many consumers prefer to choose the walking aids as a means of transportation.

A person needs to press a brake of an existing walking aid to make the walking aid stop for rest and press the brake all the time for resting for a long time. Therefore, the walking aid is not easily used and the height of the walking aid cannot be adjusted according to use needs during use, providing poor use effect.

No effective solution is currently proposed to resolve the above problem in related technologies.

SUMMARY

The present invention provides an easily adjustable walking aid to resolve the above technical problem existing in the prior art.

For this purpose, technical solutions of the present invention are described as follows.

an easily adjustable walking aid, including two support frames, where the support frame is provided with a first adjusting assembly, a telescopic adjusting seat is disposed between the two support frames, a second adjusting assembly is disposed on the support frame, and a part of the second adjusting assembly is connected to the first adjusting assembly; and the first adjusting assembly includes a first moving wheel and a second moving wheel, the first moving wheel is disposed on one side of the support frame through a rotating shaft, one end of the support frame is provided with an adjusting seat through a first bearing, and the second moving wheel is disposed on the adjusting seat through a first rotating shaft.

Further, to better ensure synchronous braking, the support frame is provided with an adjusting plate, a moving groove is formed in the adjusting plate, a first brake pad is connected in the moving groove, one side of the first brake pad is provided with a first telescopic rod and a second telescopic rod, and first adjusting springs are disposed on peripheries of the first telescopic rod and the second telescopic rod.

Further, to better ensure the adjustment effect, one end of each of the first telescopic rod and the second telescopic rod is provided with a mounting rod, one end of the mounting rod is disposed on the first moving wheel through a second bearing, two sides of the adjusting seat are provided with mounting seats, and a third telescopic rod and a fourth telescopic rod are disposed on the mounting seats.

Further, to better ensure the brake effect, second adjusting springs are disposed on peripheries of the third telescopic rod and the fourth telescopic rod, one end of each of the third telescopic rod and the fourth telescopic rod is provided with a second brake pad through a second rotating shaft, the first brake pad and the second brake pad are provided with brake lines, and one end of the brake line extends from the outside of the support frame to the inside of the support frame.

Further, to better ensure the height adjustment effect of the walking aid, the second adjusting assembly includes an adjusting rod, the adjusting rod is disposed inside the support frame, one end of the support frame is provided with a movable seat, the movable seat is connected to a clamped plate through a third rotating shaft, and the clamped plate matches the movable seat.

Further, to better ensure the adjustment and limiting effect, one side of the clamped plate is provided with a clamped protrusion, a plurality of clamping holes are formed in the adjusting rod, the clamped protrusion matches the clamping holes, one end of the adjusting rod is provided with a handrail and a brake handle, and the handrail is provided with an anti-skid structure.

Further, the brake line is connected to the brake handle, one side of the handrail is provided with an adjusting ring and a placing seat through a third bearing, a limiting hook is connected to the adjusting ring, the limiting hook is clamped in the placing seat, and a protective backrest is disposed between the two support frames.

Beneficial effects of the present invention are as follows. The first adjusting assembly cooperates with the second adjusting assembly, so that when the walking aid is braked, a brake handle can be prevented from being pressed for a long time, and four wheels of the walking aid can also be braked synchronously, ensuring the stability of the walking aid during use. In addition, the height of the walking aid can be adjusted based on the height of a user, so that the walking aid can be better adapted to different users, and the use effect of the walking aid can be better ensured. What's more, the telescopic adjusting seat is disposed for better storing the walking aid, so that the walking aid can be better used and carried.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

Figure 1:
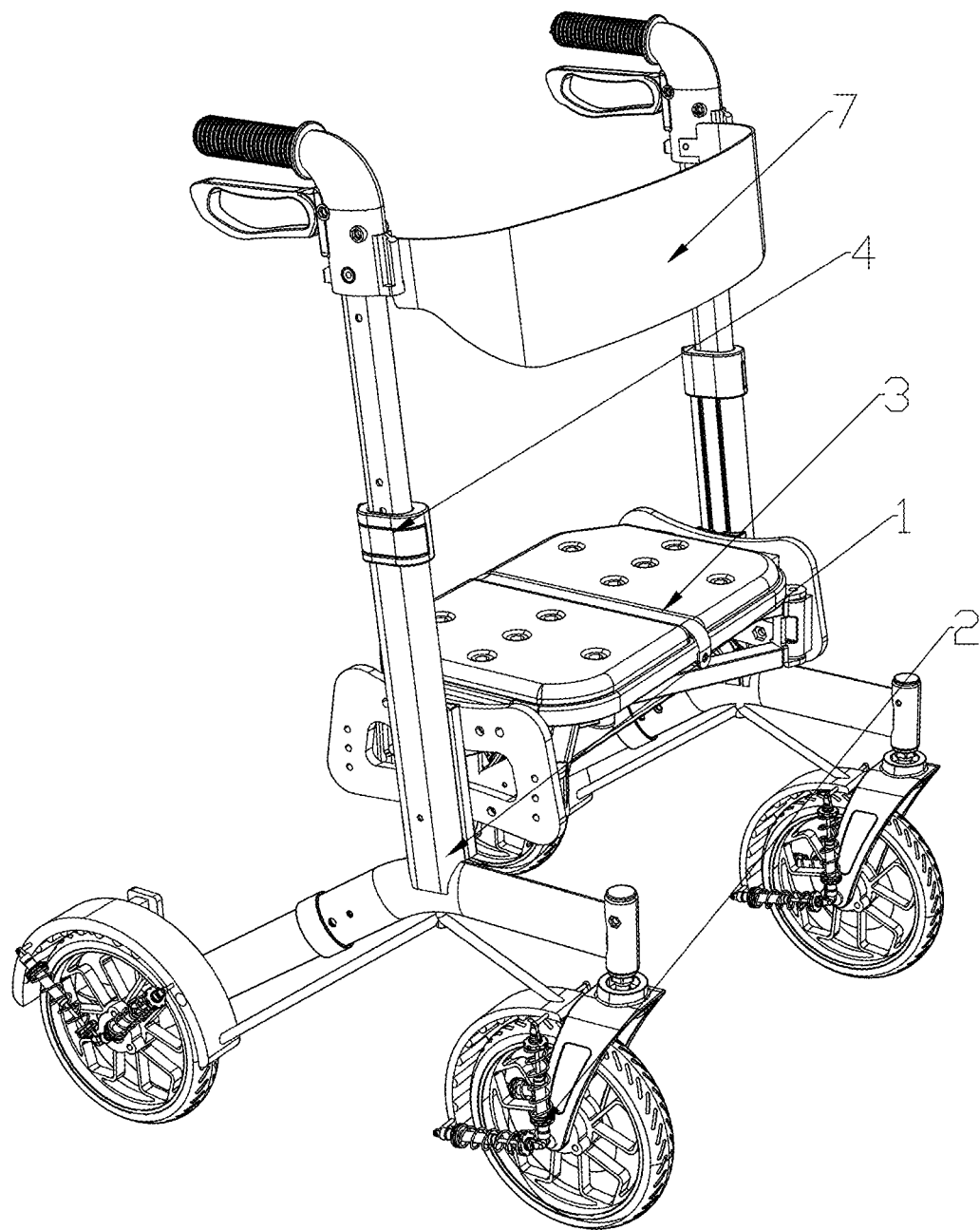
FIG. 1 is a first schematic structural diagram of an easily adjustable walking aid according to an embodiment of the present invention.

in the drawings,
1. support frame; 2. first adjusting assembly; 201. first moving wheel; 202. second moving wheel; 203. adjusting seat; 204. adjusting plate; 205. first brake pad; 206. first telescopic rod; 207. second telescopic rod; 208. first adjusting spring; 209. mounting seat; 210. third telescopic rod; 211. fourth telescopic rod; 212. second adjusting spring; 213. second brake pad; 214. brake line; 215. mounting rod; 3. telescopic adjusting seat; 4. second adjusting assembly; 401. adjusting rod; 402. movable seat; 403. clamped plate; 404. clamped protrusion; 405. handrail; 406. brake handle; 407. adjusting ring; 408. placing seat; 409. limiting hook; 5. moving groove; 6. clamping hole; 7. protective backrest.

DETAILED DESCRIPTION OF THE EMBODIMENTS

The following clearly and completely describes technical solutions in embodiments of the present invention with reference to accompanying drawings in the embodiments of the present invention. Apparently, the described embodiments are merely some but not all of the embodiments of the present invention. Based on the embodiments of the present invention, all other embodiments obtained by those of ordinary skill in the art without creative effort fall within the protection scope of the present invention.

An easily adjustable walking aid is provided according to embodiments of the present invention.

First Embodiment

Figure 2:
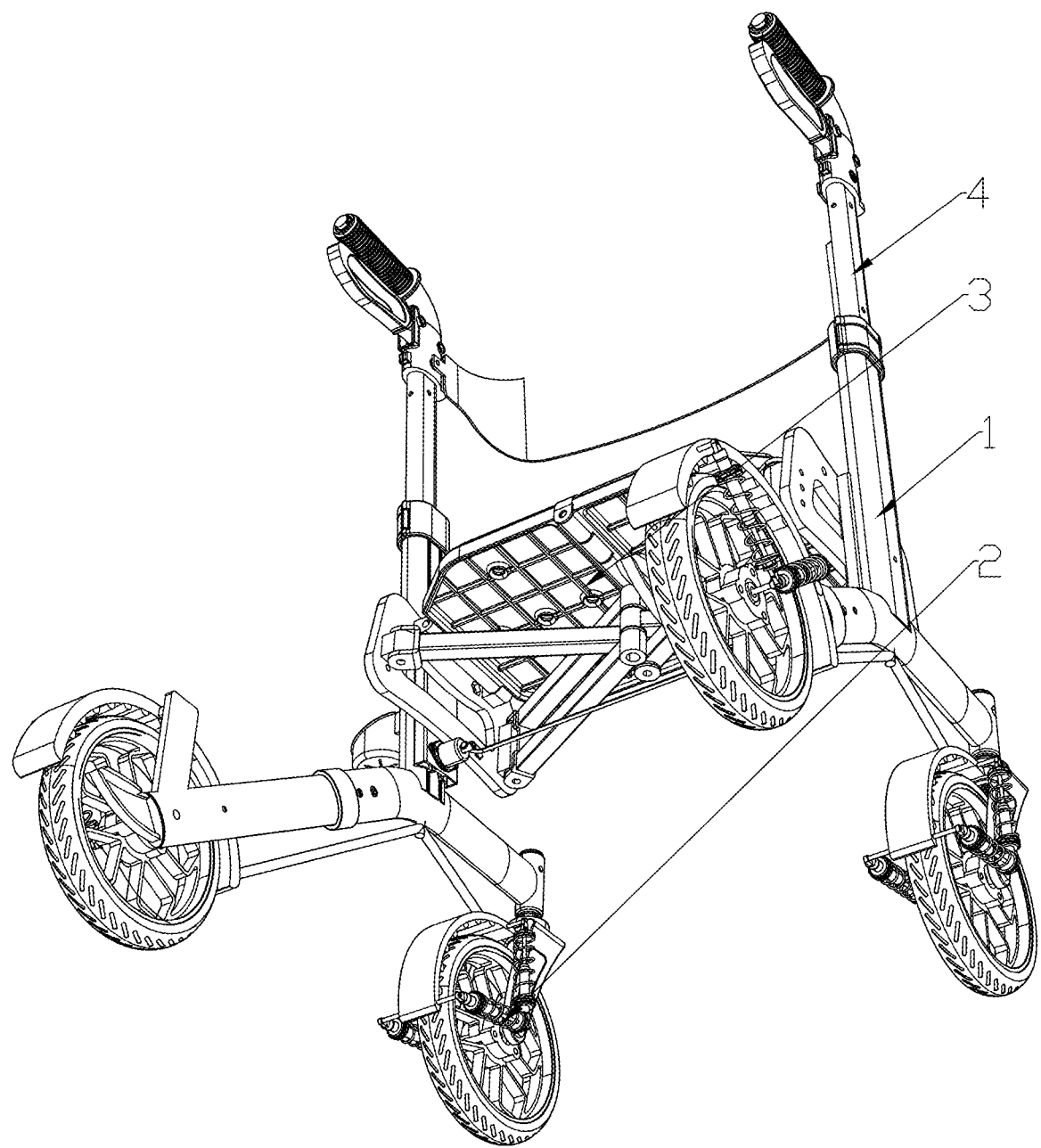
FIG. 2 is a second schematic structural diagram of the easily adjustable walking aid according to an embodiment of the present invention.
Figure 3:
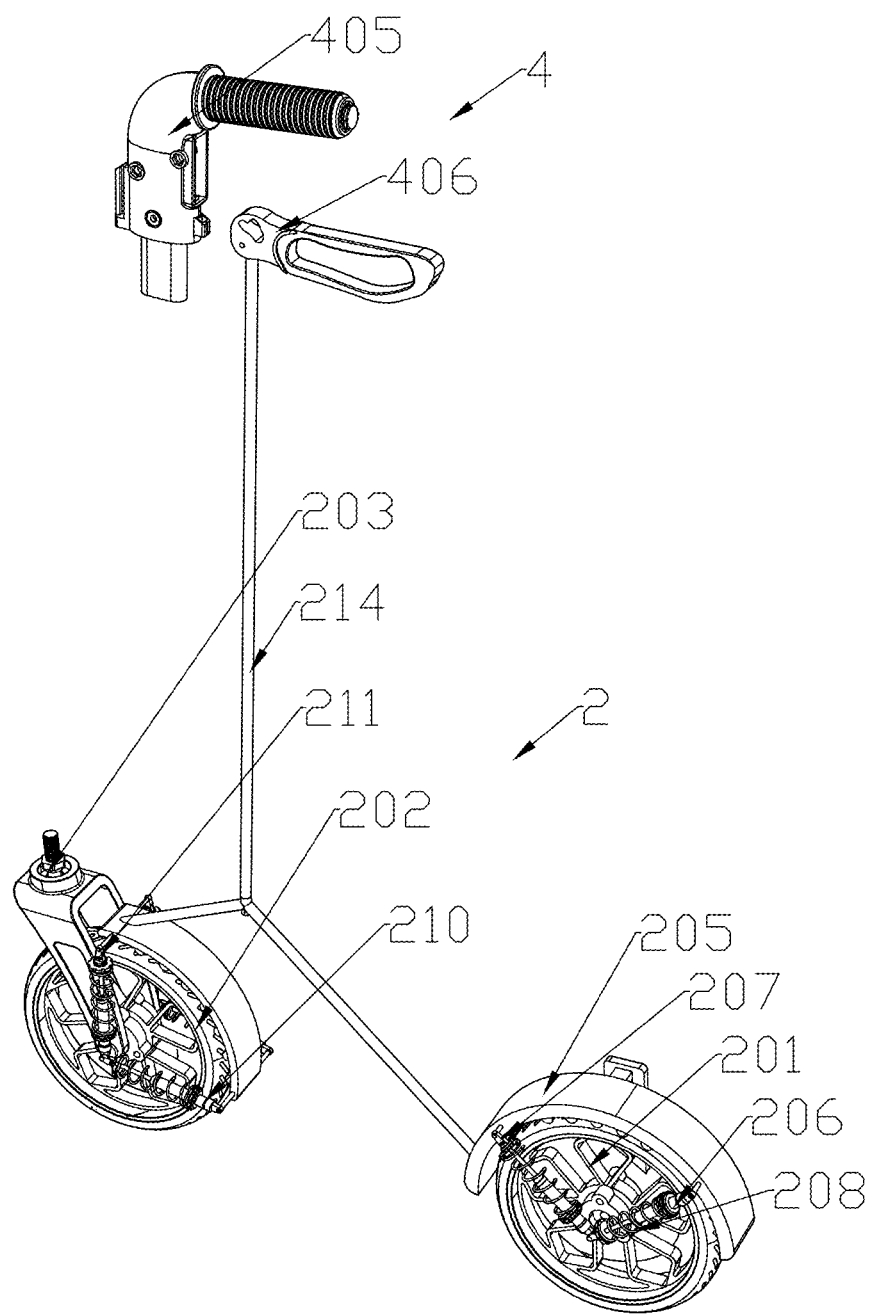
FIG. 3 is a first schematic structural diagram of a first adjusting assembly of the easily adjustable walking aid according to an embodiment of the present invention.
Figure 4:
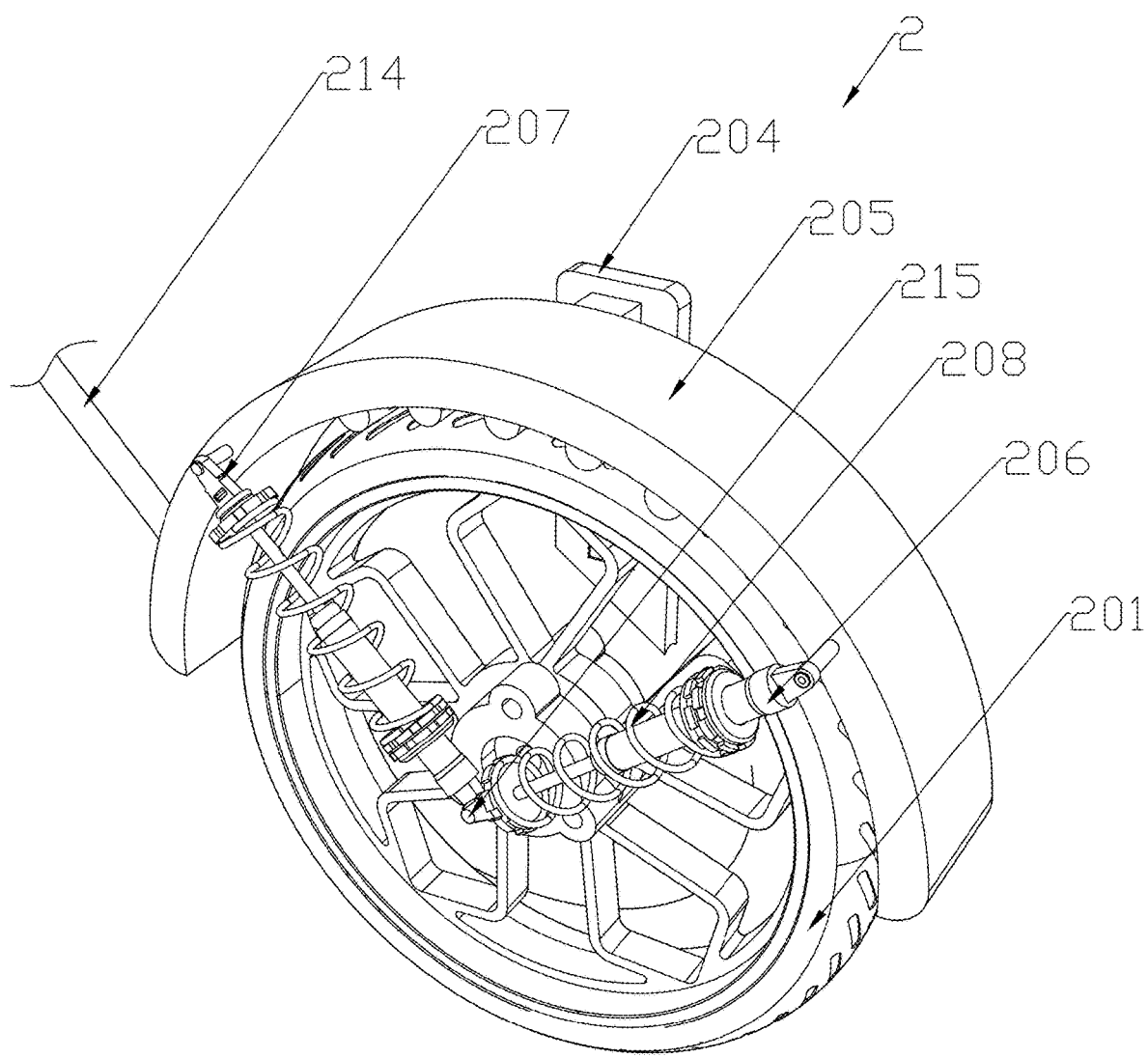
FIG. 4 is a second schematic structural diagram of the first adjusting assembly of the easily adjustable walking aid according to an embodiment of the present invention.
Figure 5:
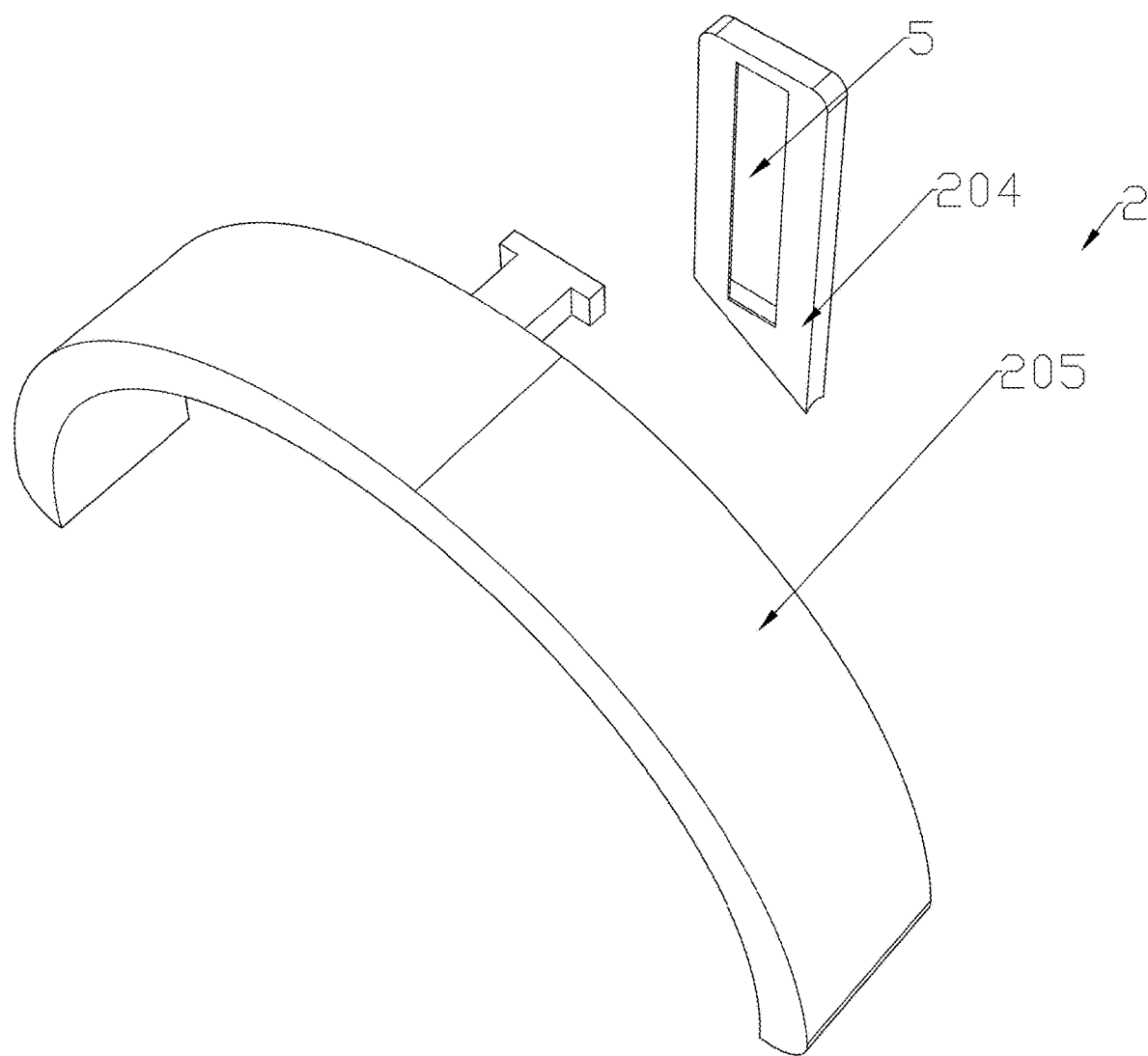
FIG. 5 is a third schematic structural diagram of the first adjusting assembly of the easily adjustable walking aid according to an embodiment of the present invention.
Figure 6:
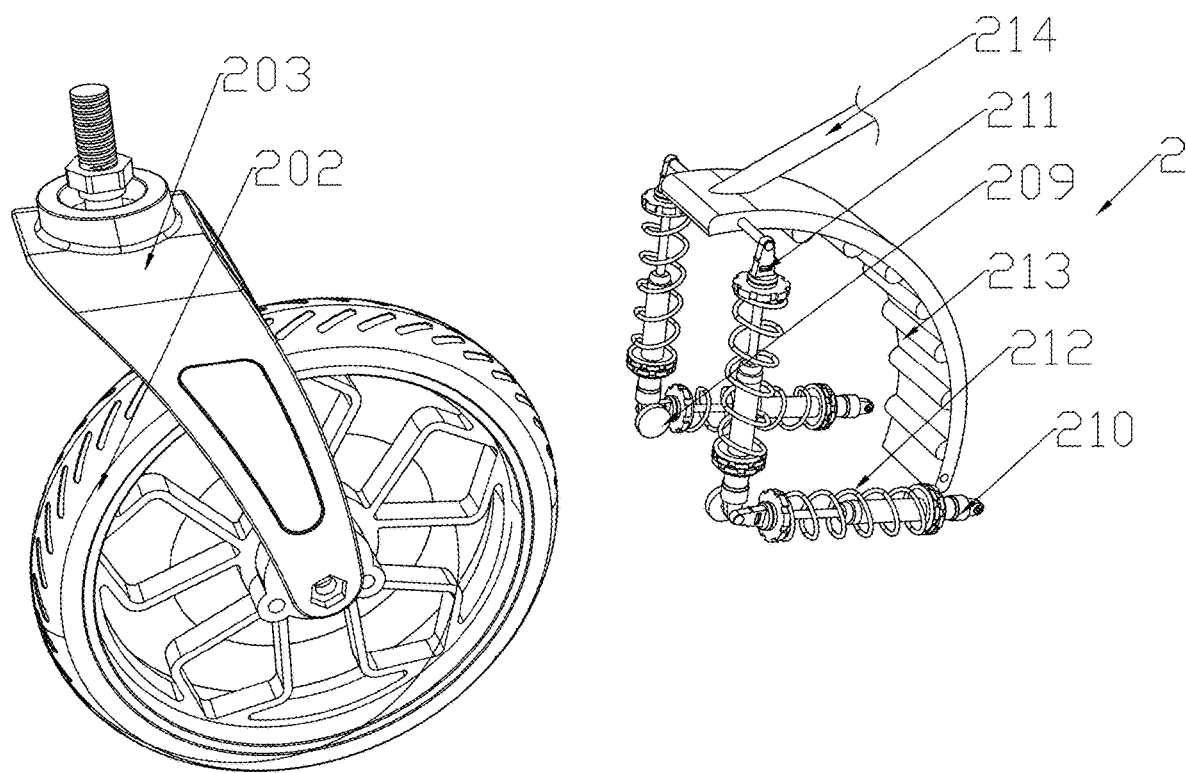
FIG. 6 is a fourth schematic structural diagram of the first adjusting assembly of the easily adjustable walking aid according to an embodiment of the present invention.
Figure 7:
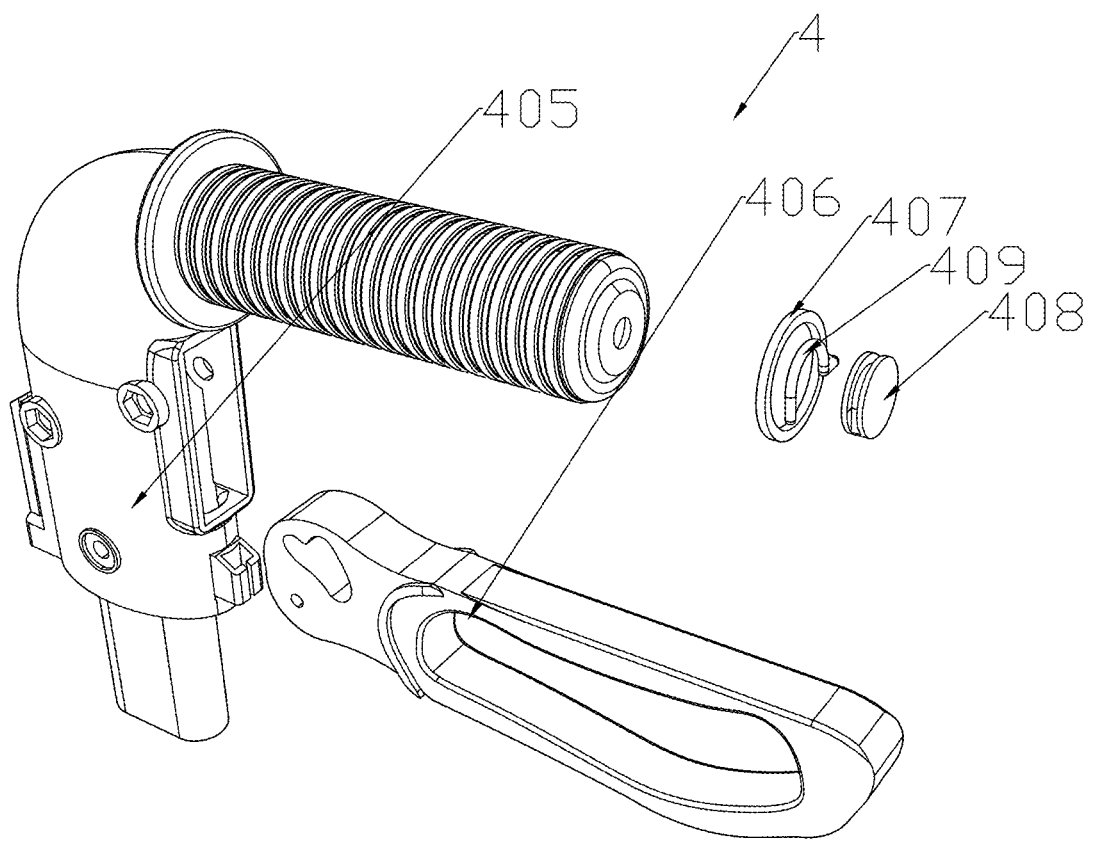
FIG. 7 is a first schematic structural diagram of a second adjusting assembly of the easily adjustable walking aid according to an embodiment of the present invention.
Figure 8:
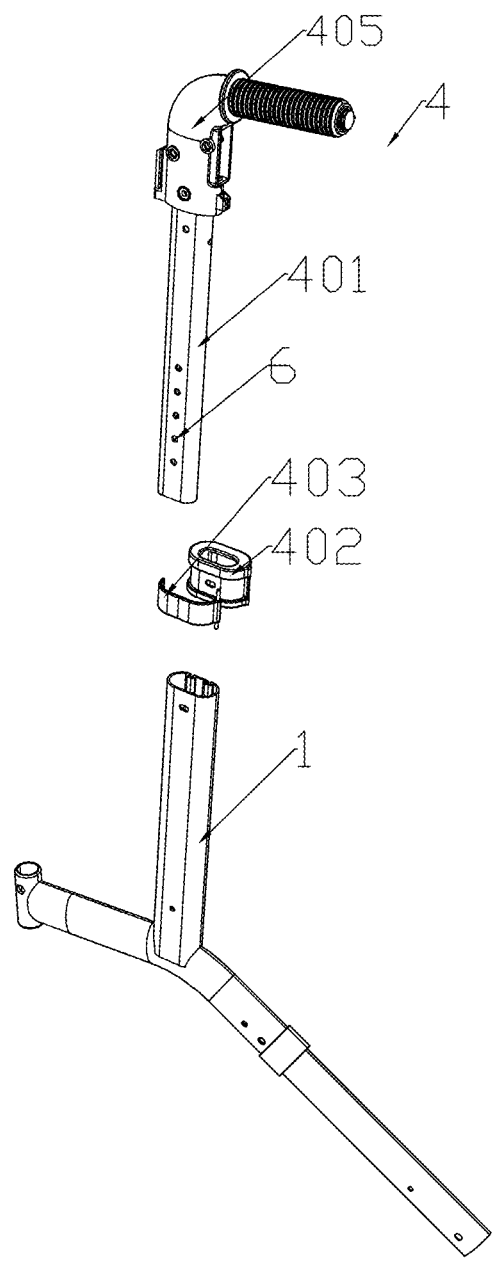
FIG. 8 is a second schematic structural diagram of the second adjusting assembly of the easily adjustable walking aid according to an embodiment of the present invention.
Figure 9:
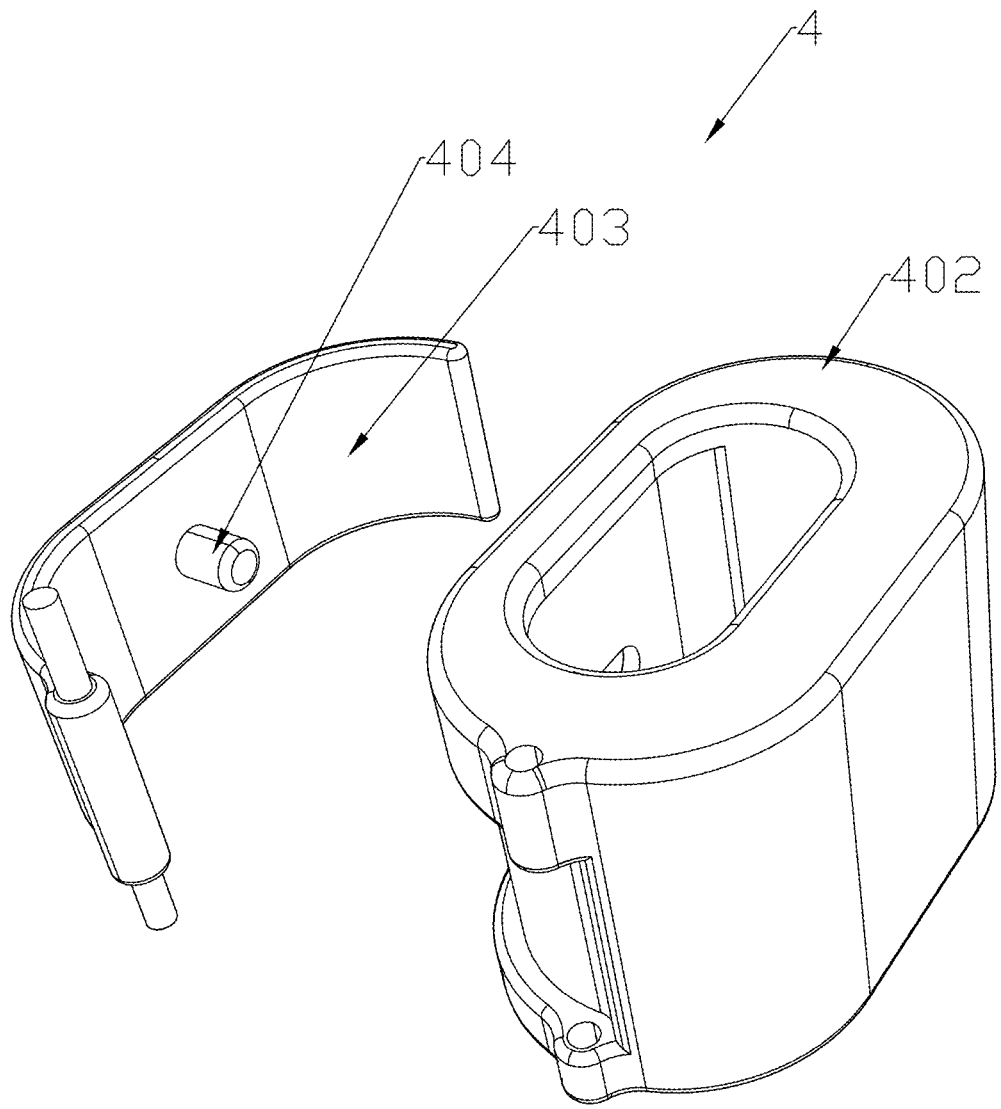
FIG. 9 is a third schematic structural diagram of the second adjusting assembly of the easily adjustable walking aid according to an embodiment of the present invention.

FIG. 1 to FIG. 9 show an easily adjustable walking aid according to embodiments of the present invention, including two support frames 1, the support frame 1 is provided with a first adjusting assembly 2 for braking the walking aid, and a telescopic adjusting seat 3 is disposed between the two support frames 1.

The telescopic adjusting seat 3 includes two seats and a plurality of folding structures and mounting plates. The support frame 1 is provided with a second adjusting assembly 4, and a part of the second adjusting assembly 4 is connected to the first adjusting assembly 2.

Second Embodiment

FIG. 1 to FIG. 9 show an easily adjustable walking aid according to embodiments of the present invention. A first adjusting assembly 2 includes a first moving wheel 201 and a second moving wheel 202. The first moving wheel 201 is disposed on one side of the support frame 1 through a rotating shaft, one end of the support frame 1 is provided with an adjusting seat 203 through a first bearing, and the second moving wheel 202 is disposed on the adjusting seat 203 through the first rotating shaft. The support frame 1 is provided with an adjusting plate 204, a moving groove 5 is formed in the adjusting plate 204, and a first brake pad 205 is connected in the moving groove 5. One side of the first brake pad 205 is provided with a first telescopic rod 206 and a second telescopic rod 207, first adjusting springs 208 are disposed on peripheries of the first telescopic rod 206 and the second telescopic rod 207, one end of each of the first telescopic rod 206 and the second telescopic rod 207 is provided with a mounting rod 215, and one end of the mounting rod 215 is disposed on the first moving wheel 201 through a second bearing. Two sides of the adjusting seat 203 are provided with mounting seats 209, the mounting seat 209 is provided with a third telescopic rod 210 and a fourth telescopic rod 211, second adjusting springs 212 are disposed on peripheries of the third telescopic rod 210 and the fourth telescopic rod 211, and one end of each of the third telescopic rod 210 and the fourth telescopic rod 211 is provided with a second brake pad 213 through a second rotating shaft. The first brake pad 205 and the second brake pad 213 are provided with brake lines 214, and one end of the brake line 214 extends from the outside of the support frame 1 to the inside of the support frame 1.

In actual application, when brake rest needs to be performed during the use of the walking aid, a brake handle 406 is pressed, and then the brake lines 214 in a relaxed state are tightened, so that the first brake pad 205 and the second brake pad 213 are inclined to one side. During tightening, through cooperation of the third telescopic rod 210 and the fourth telescopic rod 211, cooperation of the first telescopic rod 206 and the second telescopic rod 207, and cooperation of the first adjusting spring 208 and the second adjusting spring 212, synchronous brake effect of the walking aid can be better ensured.

Third Embodiment

FIG. 1 to FIG. 9 show an easily adjustable walking aid according to embodiments of the present invention. A second adjusting assembly 4 includes an adjusting rod 401, the adjusting rod 401 is disposed inside the support frame 1, one end of the support frame 1 is provided with a movable seat 402, and a clamped plate 403 is connected to the movable seat 402 through a third rotating shaft. The clamped plate 403 matches the movable seat 402, one side of the clamped plate 403 is provided with a clamped protrusion 404, a plurality of clamping holes 6 are formed in the adjusting rod 401, and the clamped protrusion 404 matches the clamping holes 6. One end of the adjusting rod 401 is provided with a handrail 405 and a brake handle 406, the handrail 405 is provided with an anti-skid structure, the brake line 214 is connected to the brake handle 406, one side of the handrail 405 is provided with an adjusting ring 407 and a placing seat 408 through a third bearing, a limiting hook 409 is connected to the adjusting ring 407, and the limiting hook 409 is clamped in the placing seat 408.

In actual application, when the height of the walking aid needs to be adjusted, the clamped plate 403 that is snap-fitted is pulled toward one side, the adjusting rod 401 is pulled upward, and then the clamped plate 403 is clamped in the movable seat 402 again, so that the clamped protrusion 404 on the clamped plate 403 enters the clamping hole 6 in the adjusting rod 401, and the height of the walking aid can be adjusted to be better adapted to different users, and the use effect of the walking aid can be further ensured. When the brake handle 406 needs to be fastened, the limiting hook 409 is taken out from the placing seat 408, and then the placing seat 408 hooks, through the adjusting ring 407, the brake handle 406 that is pulled, so that the walking aid can be rotated for a long time, preventing the brake handle 406 from being pressed for a long time, resulting in use inconvenience.

To help understand the above technical solution of the present invention, a working principle or an operation mode of the present invention in an actual process is described in detail below.

To sum up, with the help of the above technical solution of the present invention, when the walking aid needs to be braked for rest during use, the brake handle 406 is pressed, and then the brake line 214 in a relaxed state is tightened, so that the first brake pad 205 and the second brake pad 213 are inclined to one side. During tightening, through cooperation of the third telescopic rod 210 and the fourth telescopic rod 211, cooperation of the first telescopic rod 206 and the second telescopic rod 207, and cooperation of the first adjusting spring 208 and the second adjusting spring 212, synchronous brake effect of the walking aid can be better ensured. When the brake handle 406 needs to be fastened, the limiting hook 409 is taken out from the placing seat 408, and then the placing seat 408 hooks, through the adjusting ring 407, the brake handle 406 that is pulled, so that the walking aid can be rotated for a long time, preventing the brake handle 406 from being pressed for a long time, resulting in use inconvenience. When the height of the walking aid needs to be adjusted, the clamped plate 403 that is snap-fitted is pulled toward one side, the adjusting rod 401 is pulled upward, and then the clamped plate 403 is clamped in the movable seat 402 again, so that the clamped protrusion 404 on the clamped plate 403 enters the clamping hole 6 in the adjusting rod 401, and the height of the walking aid can be adjusted to be better adapted to different users, and the use effect of the walking aid can be better ensured.

The above description is only a preferred embodiment of the present invention and is not used to limit the present invention. Any modifications, equivalent substitutions, improvements, and the like made within the spirit and principle of the present invention should be included within the protection scope of the present invention.

What is claimed is:

1. An easily adjustable walking aid, comprising two support frames, wherein one support frame of the two support frames is provided with a first adjusting assembly, a telescopic adjusting seat is disposed between the two support frames, a second adjusting assembly is disposed on the one support frame, and the second adjusting assembly is connected to the first adjusting assembly, and wherein the support frame is provided with an adjusting plate, a moving groove is formed in the adjusting plate, a first brake pad is connected in the moving groove, one side of the first brake pad is provided with a first telescopic rod and a second telescopic rod, and first adjusting springs are disposed on peripheries of the first telescopic rod and the second telescopic rod; and the first adjusting assembly comprises a first moving wheel and a second moving wheel, the first moving wheel is disposed on one side of the support frame through a rotating shaft, one end of the support frame is provided with an adjusting seat through a first bearing, and the second moving wheel is disposed on the adjusting seat through a first rotating shaft, wherein the telescopic adjusting seat is configured to adjust a spacing between the two support frames to accommodate different user seating requirements.

2. The easily adjustable walking aid according to claim 1, wherein one end of each of the first telescopic rod and the second telescopic rod is provided with a mounting rod, one end of the mounting rod is disposed on the first moving wheel through a second bearing, two sides of the adjusting seat are provided with mounting seats, and a third telescopic rod and a fourth telescopic rod are disposed on the mounting seats.

3. The easily adjustable walking aid according to claim 2, wherein second adjusting springs are disposed on peripheries of the third telescopic rod and the fourth telescopic rod, one end of each of the third telescopic rod and the fourth telescopic rod is provided with a second brake pad through a second rotating shaft, the first brake pad and the second brake pad are provided with brake lines, and one end of the brake line extends from the outside of the support frame to the inside of the support frame.

4. The easily adjustable walking aid according to claim 3, wherein the second adjusting assembly comprises an adjusting rod, the adjusting rod is disposed inside the support frame, one end of the support frame is provided with a movable seat, the movable seat is connected to a clamped plate through a third rotating shaft, and the clamped plate matches the movable seat.

5. The easily adjustable walking aid according to claim 4, wherein one side of the clamped plate is provided with a clamped protrusion, a plurality of clamping holes are formed in the adjusting rod, the clamped protrusion matches the clamping holes, one end of the adjusting rod is provided with a handrail and a brake handle, and the handrail is provided with an anti-skid structure.

6. The easily adjustable walking aid according to claim 5, wherein the brake line is connected to the brake handle, one side of the handrail is provided with an adjusting ring and a placing seat through a third bearing, a limiting hook is connected to the adjusting ring, the limiting hook is clamped in the placing seat, and a protective backrest is disposed between the two support frames.

* * * * *